United States Patent [19]
Albers et al.

[11] Patent Number: 5,681,221
[45] Date of Patent: Oct. 28, 1997

[54] TORSIONAL VIBRATION DAMPER

[75] Inventors: Albert Albers, Bühl/Baden; Jürgen Pfeiffer, Gaimersheim, both of Germany

[73] Assignee: LuK Lamellen und Kupplungsbau GmbH, Bühl, Germany

[21] Appl. No.: 534,394

[22] Filed: Sep. 27, 1995

Related U.S. Application Data

[63] Continuation-in-part of Ser. No. 486,197, Jun. 7, 1995, abandoned.

[30]    Foreign Application Priority Data

Jul. 1, 1994 [DE] Germany ............... 44 23 114.8

[51] Int. Cl.$^6$ .............................. F16F 15/121; F16D 3/12
[52] U.S. Cl. .................. 464/67; 192/213; 464/64
[58] Field of Search ..................... 464/24, 64, 66, 464/68, 67; 192/206, 212, 213; 74/574

[56]    References Cited

U.S. PATENT DOCUMENTS

| | | | |
|---|---|---|---|
| 4,747,800 | 5/1988 | Takeuchi | 464/68 X |
| 5,032,107 | 7/1991 | Umeyama et al. | 464/68 |
| 5,042,632 | 8/1991 | Jäckel | 192/106.2 |
| 5,065,642 | 11/1991 | Kagiyama et al. | 464/68 X |
| 5,072,818 | 12/1991 | Kuhne | 464/68 X |
| 5,097,721 | 3/1992 | Umeyama | 464/68 X |
| 5,105,681 | 4/1992 | Naudin et al. | 464/68 X |
| 5,146,811 | 9/1992 | Jäckel | 74/574 |
| 5,156,067 | 10/1992 | Umeyama | 464/68 X |
| 5,160,007 | 11/1992 | Reik | 192/70.17 |
| 5,161,660 | 11/1992 | Huber | 192/106.2 |
| 5,180,335 | 1/1993 | Maucher | 464/68 |
| 5,213,188 | 5/1993 | Feser et al. | 464/68 X |
| 5,367,921 | 11/1994 | Fukushima | 464/68 X |

*Primary Examiner*—Daniel P. Stodola
*Assistant Examiner*—Eileen A. Dunn
*Attorney, Agent, or Firm*—Darby & Darby

[57]    ABSTRACT

A damper between coaxial input and output members in the composite flywheel of a motor vehicle has a pair of elongated arcuate coil springs which alternate with the radially outwardly extending arms of a flange-like component. The arms have first sides which stress the adjacent first end convolutions of the springs during rotation of the two members relative to each other in a first direction (e.g., when the engine drives the wheels), and second sides which stress the adjacent second end convolutions of the springs during rotation of the two members relative to each other in a second direction (e.g., when the vehicle is coasting). At least one side of at least one arm is different from at least one other side; for example, the at least one side can have one or more projections or a recess for the radially outermost part of the adjacent end convolution.

28 Claims, 6 Drawing Sheets

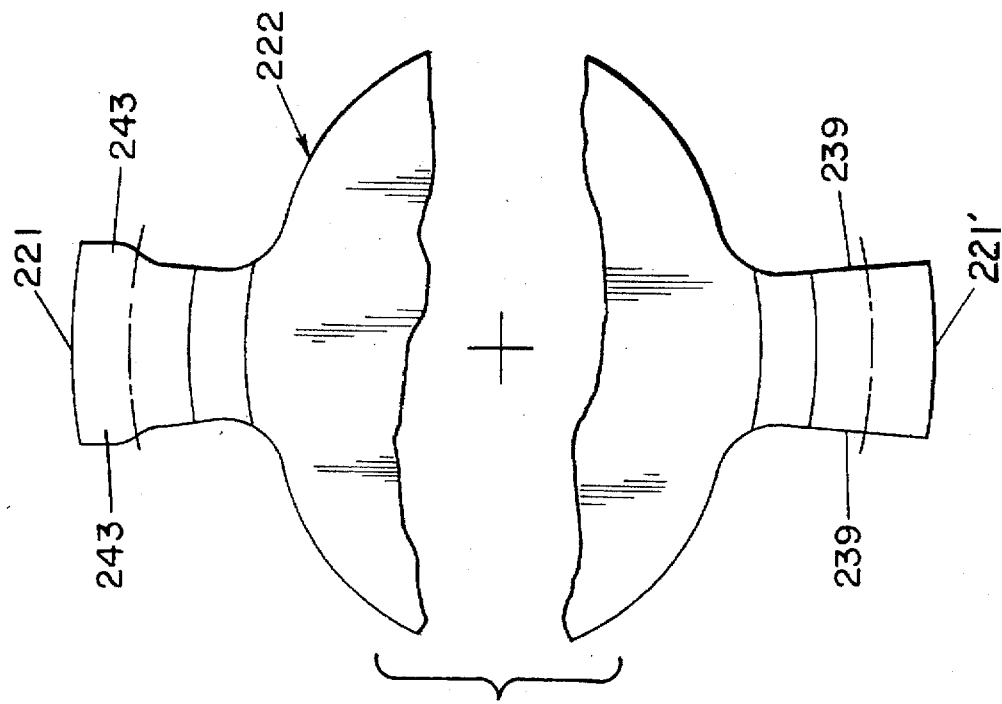
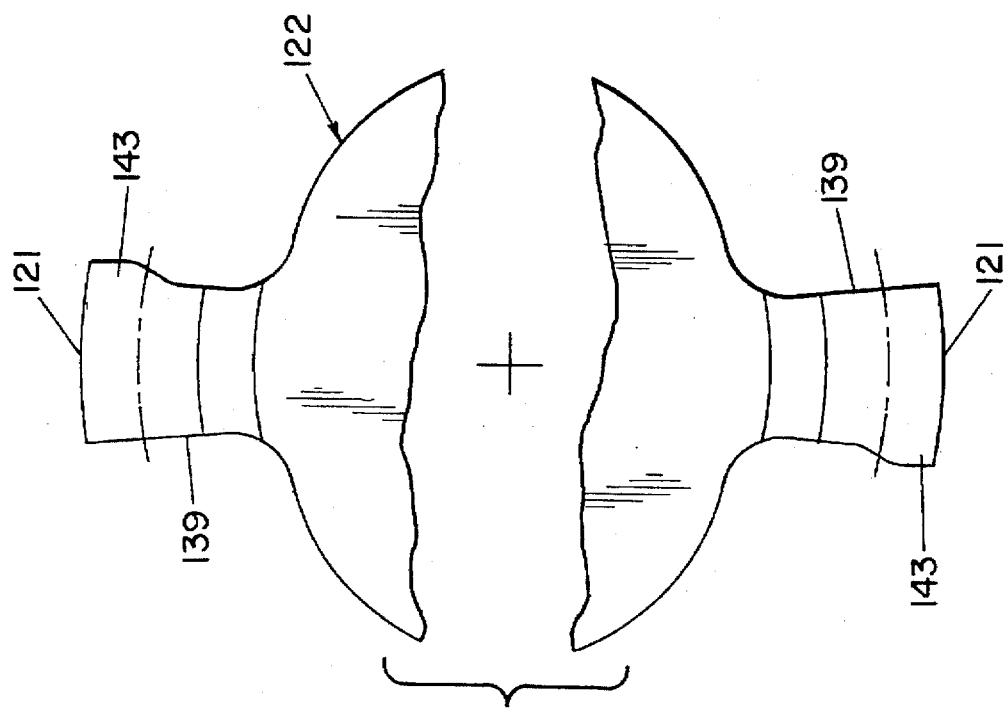

TORSIONAL VIBRATION DAMPER

This is a continuation-in-part of our patent application Ser. No. 08/486,197, filed Jun. 7, 1995, for "FLANGE-LIKE MEMBER FOR USE IN DAMPERS", now abandoned.

BACKGROUND OF THE INVENTION

The present invention relates to substantially flange-like rotary components which can be utilized for the application of stresses to energy storing devices, e.g., to energy storing devices composed of two or more arcuate coil springs which serve to transmit torque between rotary input and output members forming part of a torsional vibration damper for use in the power train between the prime mover (such as a combustion engine) and the variable-speed transmission and/or another driven unit of a motor vehicle. More particularly, the invention relates to improvements in substantially flange-like rotary components (hereinafter called flanges for short) which are especially suitable for the transmission of forces to or from two or more arcuate coil springs which together form an annular energy storing device interposed between coaxial input and output members which can rotate about a common axis, e.g., to transmit torque between a primary flywheel and a secondary flywheel forming part of a composite flywheel between the rotary output element of a combustion engine and the clutch disc or clutch plate forming part of a friction clutch which is designed to transmit torque from the secondary flywheel to the input shaft of a variable-speed transmission in a passenger car, a truck or another motor vehicle.

A flange of the above outlined character has an annular main portion and several arms which extend from the main portion substantially radially of the common axis of the input and output members and alternate with the coil springs of the energy storing device. The latter is installed in a housing which can form part of one of the input and output members and the housing includes or carries abutments which flank the arms (as seen in the axial direction of the input and output members) and can transmit torque to or can receive torque from the adjacent end convolutions of the respective coil springs.

As already mentioned above, flanges of the above outlined character can be utilized in torsional vibration dampers in the power trains between the prime movers and one or more driven units of a motor vehicle. However, such flanges can be used with equal or similar advantage in many kinds of elastic dampers, torsional vibration dampers other than those intended for use in the power trains of motor vehicles, as well as between the primary and secondary masses of all or nearly all composite flywheels wherein the masses should be free to perform at least some angular movements relative to each other against the opposition of one or more torsional vibration dampers. It is to be noted here that the invention also relates to devices, such as dampers, composite flywheels and other systems or aggregates which employ, or which can employ, the improved flange in conjunction with two or more arcuate coil springs.

For example, it is well known to employ a flange of the above outlined character in a torsional vibration damper between the primary and secondary masses of a composite flywheel. The flange is non-rotatably affixed to the secondary mass and serves to rotate the secondary mass when the it receives torque from the primary mass which, in turn, is driven by the combustion engine when a vehicle embodying such structure is in the process of pulling a load, i.e., when the engine drives one or more wheels of the vehicle. The flange receives torque from the primary flywheel by way of two or more arcuate coil springs and transmits torque to the secondary mass, either as a result of the provision of a form-locking connection between the flange and the secondary mass, as a result of frictional engagement between the flange and the secondary mass, or by way of one or more energy storing elements which are interposed between the flange and the secondary mass.

The direction of transmission of torque is reversed when the vehicle is coasting, i.e., when the wheel or wheels drive the output element of the engine by way of the composite flywheel. The secondary mass of the composite flywheel then constitutes the input member and the primary mass constitutes the output member of the damper which further includes the flange and the energy storing device employing two or more arcuate coil springs. The arms of the flange then stress the coil springs which, in turn, rotate the primary mass of the composite flywheel.

Composite flywheels of the above outlined character have found wide acceptance in the automobile industries because they contribute to the comfort of the occupant or occupants of the vehicle. This is due to the fact that such composite flywheels render it possible to operate the combustion engine within a relatively low RPM range which, in turn, renders it possible to operate the variable-speed transmission at higher speed ratios. Such mode of operating the transmission entails substantial savings in fuel.

However, composite flywheels employing torsional vibration dampers with the above outlined flanges and energy storing devices can generate some problems in conjunction with certain types of combustion engines. For example, if a vehicle is driven by a four-cylinder engine, its chassis is likely to generate a certain amount of noise, known as booming, when the vehicle is coasting. Such booming is believed to be attributable to, or to become more pronounced, due to some sort of resonance and is believed to arise as a result of temporary transitional rigidity or stiffness of the composite flywheel during shifting from operation with pull to coasting. Such pronounced stiffness or spring gradient is believed to develop because the coil springs of the energy storing device are stressed when the vehicle is in the process of pulling a load. The springs tend to move radially outwardly under the action of centrifugal force as the RPM of the primary flywheel increases, and this causes the springs to move into frictional engagement with the adjacent part or parts. Such frictional engagement can rise to a value such that the springs cannot fully dissipate the stored energy during transition from operation with pull to coasting. In other words, the springs remain in stressed condition due to the existence of frictional engagement between their convolutions and the surface or surfaces of one or more parts which are radially outwardly adjacent thereto. If the operation with pull is followed by coasting, this can bring about at least one of the following two undesirable consequences: Firstly, the flange is not subjected to any restoring or resetting forces. Secondly, a different side of each arm of such flange comes into engagement with the adjacent end convolution of the respective coil spring, namely a spring upon which the arm is supposed to bear while the vehicle is coasting. However, this same spring is still maintained in stressed condition as a result of frictional engagement between the radially outer portions of its convolutions with the surface or surfaces which are immediately adjacent thereto. This results in the establishment of a very pronounced spring gradient and a highly pronounced damping action. In certain extreme situations, at least the inner portions of the convolutions of such arcuate springs are likely to come into full abutment with each other so that each such spring acts not unlike a solid body which cannot yield in response to the application of additional stresses acting in the circumferential direction of the energy storing device.

OBJECTS OF THE INVENTION

An object of the invention is to provide a flange which is designed, which is installed and which operates in such a way that it enables the coil springs to move the radially outer portions of their convolutions out of frictional engagement with the adjacent surface or surfaces during transition from operation with pull to coasting.

Another object of the invention is to provide a flange which reduces the likelihood of total compression of coil springs under circumstances when such total compression is undesirable or harmful.

A further object of the invention is to provide a novel and improved combination of a flange with the energy storing device of a damper, such as a torsional vibration damper.

An additional object of the invention is to provide the above outlined flange with one or more novel and improved arms.

Still another object of the invention is to provide a novel and improved damper which utilizes the above outlined flange.

A further object of the invention is to provide a motor vehicle including a power train which employs the above outlined flange or at least one damper embodying the above outlined flange.

Another object of the invention is to provide a composite flywheel which utilizes a torsional vibration damper embodying the above outlined flange.

An additional object of the invention is to provide a flange which can be installed in many existing types of dampers as a superior substitute for heretofore known flanges.

Still another object of the invention is to provide a simple flange which can be mass-produced at low cost from available materials and can be readily designed for service in dampers which are called upon to transmit small, medium large or large torques.

SUMMARY OF THE INVENTION

One feature of the present invention resides in the provision of a substantially flange-like rotary component for the application of stresses to an energy storing device of the type including at least two arcuate coil springs having first and second end convolutions and centers of curvature at least close to a rotational axis of the component. The latter comprises a main portion and at least two arms spaced apart from each other in a circumferential direction of and extending substantially radially of the axis. One of the arms is disposed between the first end convolutions and another of the arms is disposed between the second end convolutions of the at least two springs, as seen in the circumferential direction of the component. The one arm is adjacent at least one first abutment for the first end convolutions of the at least two springs, and the other arm is adjacent at least one second abutment for the second end convolutions of the at least two springs (as as seen in the direction of the axis of the rotary component). The main portion is turnable about the axis of the component in a first direction to cause the arms to stress the first end convolutions, and the main portion is also turnable about the axis in a second direction counter to the first direction to cause the arms to stress the second end convolutions. The arms have first sides engageable with the first end convolutions and the arms further have second sides engageable with the second end convolutions. At least one of the first and/or second sides is different from at least one other side, namely in such a way that it can engage a selected portion of the adjacent end convolution, particularly the portion remotes from or nearest to the axis of the rotary component.

The first sides of the arms can but need not be at least substantially identical.

The arrangement is preferably such that each of the arms is disposed between two abutments, as seen in the direction of the axis of the rotary component. Such abutments can form part of a housing or enclosure for the coil springs of the energy storing device.

At least one side of at least one of the arms can be provided with at least one projection extending in the circumferential direction of the rotary component. In accordance with one presently preferred embodiment, the at least one arm has a first portion more distant from and a second portion nearer to the axis of the rotary component, and the at least one projection is provided on the first portion of the at least one side of the at least one arm.

If the component is designed for the application of stresses to coil springs with end convolutions having portions remote from the aforementioned axis, the at least one projection is or can be arranged to bear against the remote portion of the respective end convolution.

As already mentioned above, the projection can be provided at the first portion of the at least one side of the at least one arm, and the radially inner portion of such at least one side of the at least one arm can be at least substantially identical with a portion of the other side of the at least one arm.

The main portion of the component can be designed to carry two arms, e.g., arms which are disposed at least substantially diametrically opposite each other.

The main portion and the arms of the improved component can form a torque transmitting part of a rotary damper.

The energy storing device can be installed in a motor vehicle, and the at least one side of the at least one arm can be designed to stress the respective end convolution when the vehicle is coasting.

Each arcuate coil spring can have one or more intermediate convolutions between the respective first and second end convolutions, and such convolutions have first portions remote from and second portions nearer to the axis of the rotary component. The second portions of all convolutions of at least one of the coil springs can abut each other in response to the application of predetermined stresses to first and second end convolutions of such at least one coil spring. The second portions of all convolutions of each of the coil springs can abut each other at least substantially simultaneously in response to the application of the predetermined stresses to the first and second end convolutions of the coil springs.

The arms are or can be spaced apart from each other a substantial distance in the circumferential direction of the main portion of the rotary component so as to provide room for arcuate coil springs having large length-to-diameter ratios.

Each side of at least one of the arms can have at least one projection extending in the circumferential direction of the rotary component. Alternatively, at least one side of each arm can be provided with at least one projection extending in the circumferential direction of the rotary component.

Still further, only one side of each arm can be provided with at least one projection extending in the circumferential direction of the rotary component. Still further, each side of one of the arms can have at least one projection extending in the circumferential direction of the rotary component, and only one side of each other arm can be provided with at least one projection extending in the circumferential direction of the rotary component.

The at least two arms of the rotary component can be at least substantial mirror images of each other with reference to a plane including the axis of the rotary component.

It is also possible to make at least one side of at least one arm different from at least one other side by providing the at least one side with at least one recess or cutout, e.g., in such position that it can receive the radially outermost part of the adjacent end convolution of a spring.

Another feature of the present invention resides in the provision of a torsional vibration damper which can be utilized with particular advantage between a combustion engine and a variable-speed transmission in a motor vehicle. The improved damper comprises input and output members which are rotatable with and relative to each other about a common axis, and means for yieldably opposing rotation of the input and output members relative to each other. The means for yieldably opposing comprises a large-diameter annular energy storing device including at least two arcuate coil springs having centers of curvature at least close to the common axis of the input and output members, and a substantially flange-like component rotatable about the common axis and including a main portion and at least two arms extending from the main portion at least substantially radially of the common axis and alternating with the at least two coil springs. The springs have first and second end convolutions and each of the arms has a first side abutting the first end convolution of each of the at least two coil springs and a second side abutting the second end convolution of each of the at least two coil springs. At least one of the sides is different from at least one of the other sides.

If the input and output members are rotatable at a plurality of different speeds, the springs will or can frictionally engage at least one of the input and output members under the action of centrifugal force with a force which increases in response to increasing rotational speed of the input and output members and operates in parallel with the bias of the springs in the circumferential direction of the annular energy storing device with attendant dynamic resistance of the coil springs to rotation with the input and output members relative to each other.

At least one of the input and output members can define a substantially annular channel or groove for at least a portion of each of the coil springs.

The coil springs can be elongated in a circumferential direction of the energy storing device.

At least one of the at least two coil springs is or can be elongated and can be composed of a plurality of relatively short coil springs as seen in the circumferential direction of the energy storing device.

The novel features which are considered as characteristic of the invention are set forth in particular in the appended claims. The improved rotary component and the improved damper themselves, however, both as to their construction and the mode of utilizing and installing the same, together with additional features and advantages thereof, will be best understood upon perusal of the following detailed description of certain presently preferred specific embodiments with reference to the accompanying drawings.

BRIEF DESCRIPTION OF THE DRAWINGS

FIG. 4a is a fragmentary elevational view of a rotary component constituting a first modification of the component which is shown in FIG. 3;

FIG. 4b is a similar view of a third rotary component;

DESCRIPTION OF PREFERRED EMBODIMENTS

Figure 1:
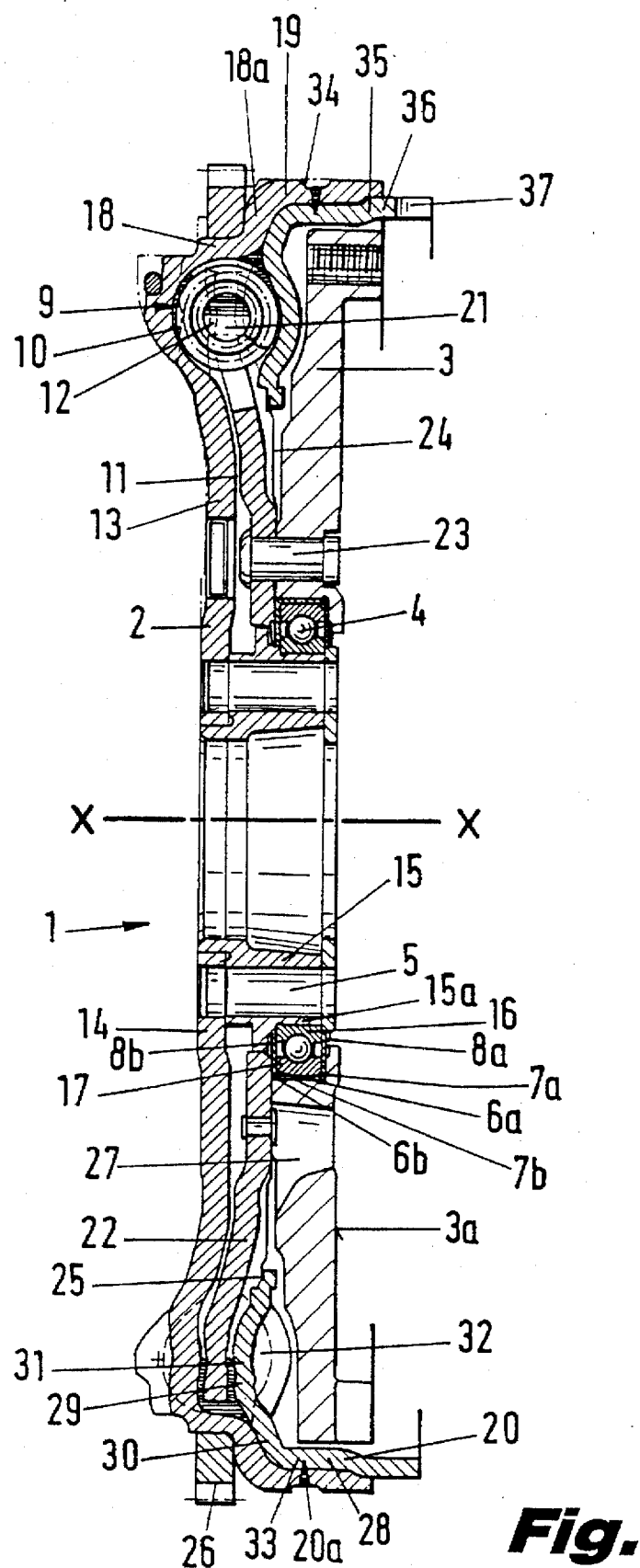
FIG. 1 is an axial sectional view of a composite twin-mass flywheel wherein the primary and secondary masses can turn relative to each other against the opposition of a damper comprising a substantially flange-like rotary component which embodies one form of the invention.
Figure 2:
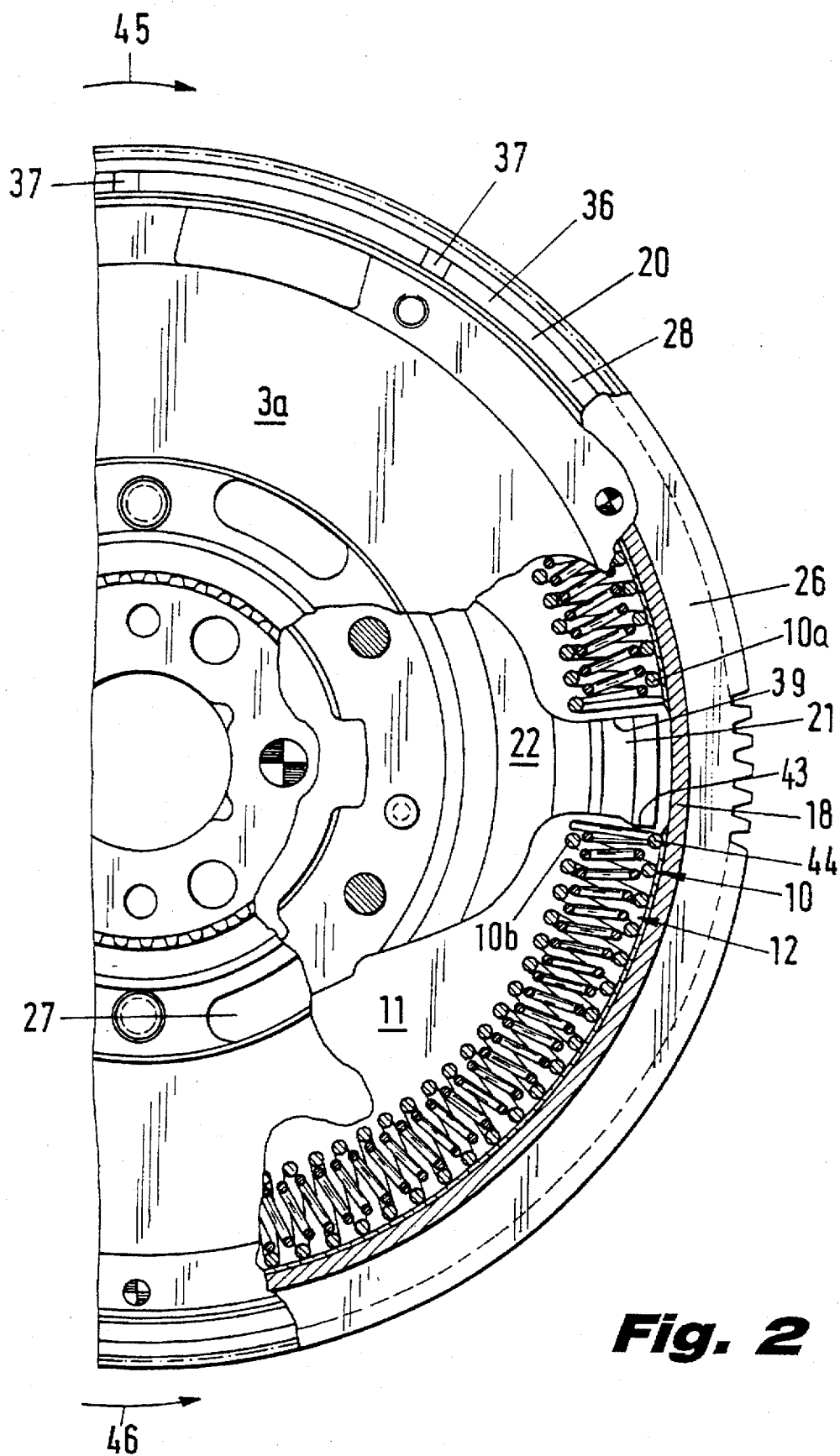
FIG. 2 is a fragmentary elevational view of the composite flywheel as seen from the right-hand side of FIG. 1, with certain parts partially broken away.

FIGS. 1 and 2 illustrate certain details of a composite flywheel 1 which comprises a primary flywheel or mass 2 connectable to the output element (e.g., a camshaft or a crankshaft) of a combustion engine in a motor vehicle, and a secondary flywheel or mass 3 which can transmit torque to or receive torque from a clutch disc or clutch plate (not shown) forming part of a friction clutch in the power train between the engine and one or more wheels and/or other driven units of the vehicle. The clutch disc or clutch plate can transmit torque to or receive torque from the input shaft of a variable-speed transmission (not shown), depending upon whether the motor vehicle is in the process of pulling a load or is coasting (i.e., when the wheels transmit torque to the output element of the engine). The clutch disc or clutch plate can be a relatively simple part including a hub which can non-rotatably surround the input shaft of the transmission and a disc carrying two sets of friction linings, one engageable by the axially movable pressure plate and the other engageable by the counterpressure plate of the friction clutch. Alternatively, the clutch disc or clutch plate can be provided with resilient elements which are disposed between and tend to move the two sets of friction linings axially and away from each other and/or with one or more dampers which yieldably oppose angular movements of the hub and friction linings relative to each other. A clutch plate or clutch disc with plural dampers between the friction linings and the hub is disclosed, for example, in commonly owned U.S. Pat. No. 5,161,660 granted Nov. 10, 1992 to Lothar Huber for "Clutch plate with plural dampers". Clutch plates with resilient elements between the two sets of friction linings are disclosed in numerous other United States patents granted to the assigneee of the present application. A power train which receives torque from the output element of a combustion engine and contains a variable-speed transmission as well as a friction clutch is disclosed, for example, in commonly owned U.S. Pat. No. 5,180,335 granted Jan. 19, 1993 to Paul Maucher et al. for "Torsion damping assembly for use with clutches in motor vehicles". The disclosures of all United States Letters Patent referred to in the specification of the present application are incorporated herein by reference.

An antifriction bearing 4 is interposed between the radially inner portions of the primary and secondary flywheels 2, 3. The bearing 4 is installed radially outwardly of axially parallel bores, holes or other suitable passages 5 for the shanks of threaded fasteners (not shown) which are used to secure the primary flywheel 2 to the output element of the engine. The bearing 4 is equipped with two thermal insulators or sealing caps 6a and 6b which establish a heat insulating barrier between the flywheels 2 and 3. More specifically, the caps prevent or reduce the transfer of heat from the secondary flywheel 3 (whose friction face 3a is in engagement with one set of friction linings on the clutch disc when the aforementioned friction clutch is engaged) to the primary flywheel 2. O-rings 7a and 7b are sealingly interposed between the radially outer portion of the outer race 17 of the bearing 4 and the caps 6a, 6b. The radially inner portions of the caps 6a, 6b are biased in the direction of the common axis X—X of the flywheels 2, 3 by diaphragm springs 8a, 8b or by other suitable resilient elements. The illustrated bearing 4 has a single row of balls; however, it is equally possible to utilize an antifriction bearing having two or even more rows of balls and/or other suitable rolling elements which are interposed between the aforementioned outer race 17 and an inner race 16 of the bearing.

The flywheels or masses 2, 3 have at least some freedom of angular movement relative to each other against the opposition of a damper 9 having an annular energy storing device composed of two elongated arcuate coil springs 10 having their centers of curvature on or at least close to the axis X—X. The springs 10 are confined in an annular chamber 11 and more specifically in a ring-shaped radially outer portion or compartment 12 of such chamber. The latter is at least partially filled with a viscous fluid, such as oil or grease.

It is presently preferred to utilize a special viscous fluid, e.g., in the form of grease, which exhibits optimal characteristics as concerns its lubricating (friction reducing) action between the coil springs 10 and the surfaces surrounding the compartment 12 of the annular chamber 11.

The selected fluid ensures the establishment of a low friction coefficient even in that region where the convolutions of the coil springs 10 bear upon the adjacent surfaces when the energy storing device including the coil springs is being acted upon at least by centrifugal force.

However, it is also possible to configurate and install the coil springs 10 in such a way that they contact the surfaces surrounding the compartment 12 of the annular chamber 11 in the housing including the main section 13 of the primary flywheel 2 and the cup-shaped member 20 also when the coil springs are not acted upon by centrifugal force.

A presently preferred viscous fluid which is to at least partially fill at least the compartment 12 of the annular chamber 11 is selected in such a way that it ensures the establishment of a friction coefficient $\mu < 0.1$.

The primary flywheel 2 comprises a main section 13 which is or which can be made of a metallic sheet material by drawing or by resorting to any other suitable technique. The central portion or hub 15 of this main section 13 is provided with the aforementioned passages 5 for the shanks of threaded fasteners which secure the primary flywheel 2 to the output element of the prime mover, such as the combustion engine of a motor vehicle. At the same time, such fasteners also secure the secondary flywheel 3 to the output element of the engine because the flywheels 2, 3 have at least some freedom of angular movement relative to each other but are compelled to share all movements in the direction of the axis X—X. The main section 13 further comprises a substantially disc-shaped portion 14 which extends radially outwardly of the hub 15 and is located between the engine and the secondary flywheel 3 of the composite flywheel 1.

The inner race 16 of the antifriction bearing 4 surrounds that (smaller-diameter) end 15a of hub 15 which is remote from the disc-shaped portion 14 of the main section 13 of the primary flywheel 2. The outer race 17 of the bearing 4 is surrounded by the radially innermost portion of the secondary flywheel 3. The latter resembles a substantially flat disc disposed in a plane which is normal to the axis X—X, and its radially outer portion is connectable to the housing or cover of a friction clutch, e.g., a clutch of the type described and shown in the aforementioned U.S. Pat. No. 5,180,540 to Paul Maucher et al. The central opening of the secondary flywheel 3 receives the entire bearing 4, including the races 16, 17, as well as the thermal insulators or caps 6a, 6b.

The radially outer part of the substantially disc-shaped portion 14 is of one piece with a relatively short and substantially sleeve-like portion 18 extending in a direction away from that side of the portion 14 which confronts the engine when the primary flywheel 2 is affixed to the output element of the engine. The radially innermost part of the sleeve-like portion 18 is disposed radially outwardly of the compartment 12 of the chamber 11 for the coil springs 10 and merges into a second part 18a which slopes radially outwardly away from the springs 10 to merge into a substantially cylindrical part 19. In the absence of any shrouds or shields (e.g., of the type disclosed in commonly owned U.S. Pat. No. 5,146,811 granted Sep. 15, 1992 to Johann Jäckel for "Vibration damping apparatus), the radially outermost portions of convolutions of the coil springs 10 bear upon the portion 18 under the action of centrifugal force when the engine is caused to rotate the composite flywheel 1 at a relatively high speed.

The cylindrical part 19 of the sleeve-like portion 18 of the main section 13 of the primary flywheel 2 surrounds the substantially cylindrical or sleeve-like radially outer section 28 of a substantially cup-shaped member 20. The member 20 and the main section 13 of the primary fywheel 2 define a housing which, in turn, defines the chamber 11 and the annular compartment 12 of such chamber. The member 20 can constitute a converted blank of metallic sheet material which is treated in a drawing or any other suitable shaping machine. The cylindrical part 19 centers the member 20 relative to the primary flywheel 2 and is sealingly secured thereto by a welded seam 20a.

The housing including the member 20 and the main section 13 defines a circular array of arcuate sockets, one for each of the coil springs 10. Neighboring ends of such sockets are partially separated from each other by abutments or retainers 31 including a first set on the member 20 and a second set defined by the radially outermost part of the disc-shaped portion 14 of the main section 13. The lower part of FIG. 1 shows an abutment 31 which is defined by the member 20 as a result of the impression of a pocket or recess 32 in the right-hand side of the member 20. The abutments of the main section 13 can be obtained by deforming the section 13 in a similar manner. Reference may be had, for example, to commonly owned U.S. Pat. No. 5,042,632 granted Aug. 27, 1991 to Johann Jäckel for "Vibration damping apparatus".

In accordance with a feature of the invention, the damper 9 further comprises a rotary component 22 which can be mass-produced from metallic sheet material and includes a substantially ring-shaped main or central portion 22a (see particularly FIG. 3) and two arms 21 which extend from the main portion 22a radially outwardly and alternate with the coil springs 10, as seen in the circumferential direction of the housing including the member 20 and the main section 13. The main portion 22a is non-rotatably affixed to the secondary flywheel 3 by rivets 23 or in any other suitable way and extends radially inwardly to overlie the outer race 17 of the bearing 4. The primary flywheel 2 can be said to constitute the input member and the secondary flywheel 3 can be said to constitute the output member of the damper 9 (when the vehicle is in the process of pulling a load). The roles of the flywheels 2 and 3 are reversed when the vehicle is coasting. The illustrated one-piece rotary component 22 can be replaced by a composite (e.g., multi-layer or multiple-section) component without departing from the spirit of the invention. For example, each of the two arms 21 (which are located at least substantially diametrically opposite each other because the energy storing device of the damper 9 actually shown in FIGS. 1 and 2 comprises only two arcuate coil springs 10 of identical size and shape, at least when the springs are not stressed as a result of angular movement of at least one of the flywheels 2, 3 relative to the other of these flywheels from a neutral or starting position) can be provided on a separate support which is non-rotatably affixed to the secondary flywheel 3. Such supports for the arms 21 then replace the one-piece main portion 22a of the rotary component 22 (hereinafter called flange for short). The flange 22 serves as a means for transmitting torque from the primary flywheel 2 to the other flywheel 3 (by way of the coil springs 10) when the vehicle embodying the structure of FIGS. 1 and 2 is in the process of pulling a load.

Each of the arms 21 is disposed between two abutments 31 (as seen in the direction of the axis X—X) when the damper 9 is not called upon to transmit torque between the flywheels 2 and 3.

The flange 22 need not be affixed directly to the secondary flywheel 3 (as actually shown in FIG. 1). For example, it is equally possible to mount the main portion 22a of the flange 22 on a carrier (not shown) which is non-rotatably (either separably or permanently) affixed to the secondary flywheel 3.

In order to further reduce the likelihood of overheating the primary flywheel 2 by excessive transfer of heat from the secondary flywheel 3 (in spite of the provision of the heat barriers constituted by the aforediscussed thermal insulators or caps 6a and 6b), the surface of the flywheel 3 can be enlarged in order to dissipate relatively large amounts of heat into the surrounding atmosphere. For example, the flywheel 3 can be made of sheet steel stock and its side or surface confronting the main section 13 of the primary flywheel 2 can be enlarged by the provision of rhomboidal, diamond-shaped or other suitable patterns. It is also possible to provide the left-hand side or surface of the secondary flywheel 3 (as seen in FIG. 1) with one or more spiral or otherwise configurated grooves by resorting to a suitable machine or tool. Also, it is possible to enlarge that side of the flywheel 3 which faces away from the friction face 3a as a result of repeated penetration of the working end of a circular milling tool at several locations radially outwardly of the axis X—X and/or at several locations as seen in the circumferential direction of the flywheel 3. If the secondary flywheel 3 is a casting, its surface facing away from the friction face 3a can be enlarged by pouring molten metal into a suitably configurated mold.

The radially outer portion of the chamber 11 (and more particularly of its annular compartment 12) is sealed by the welded seam 20a. The radially inner portion of the chamber 11 is sealed by a resilient membrane 24 which, in the embodiment of FIGS. 1 and 2, resembles a washer having its radially inner marginal portion clamped between the main portion 22a of the flange 22 and the secondary flywheel 3 (e.g., by the rivets 23 and/or by other or additional fasteners) and its radially outer marginal portion bearing against a shoulder 25 of the member 20. The median portion of the membrane 24 can be provided with axially extending deformed portions to ensure that its radially outer marginal portion bears against the shoulder 25 with a force which is necessary to prevent the escape of viscous medium from the chamber 11 and/or the penetration of foreign matter into such chamber. In actual practice, the membrane 24 is merely called upon to prevent the penetration of impurities into the chamber 11 because, at least under normal operating conditions (e.g., in the absence of an overheating of the member 20 and/or primary flywheel 2) the viscosity of fluid (oil or grease) which at least partially fills the chamber 11 suffices to render the escape of such fluid from the chamber highly unlikely. Therefore, the radially outer portion of the membrane 24 need not bear upon the shoulder 25 with a large force which could cause pronounced wear upon the membrane and/or upon the shoulder 25. The likelihood of escape of viscous fluid from the chamber 11 radially inwardly past the membrane 24 is particularly remote when the flywheels 2, 3 are driven at a relatively high speed because the centrifugal force then urges the confined supply of viscous fluid radially outwardly, i.e., into the compartment 12.

The axially extending portion 18 of the main section 13 of the primary flywheel 2 carries the customary starter gear 26 which can be welded to or shrunk onto or otherwise non-rotatably mounted on the part 18.

The composite flywheel 1 can be assembled with other parts of a friction clutch into a module at the manufacturing plant, and such module is then ready for storage, for shipment and for installation in the power train between the engine and one or more wheels of a motor vehicle. For example, the module can further comprise a clutch cover or housing, a pressure plate which is non-rotatably but axially movably affixed to the cover, a clutch spring which biases the pressure plate axially toward the counterpressure plate (namely the secondary flywheel 3) and a clutch disc or clutch plate between the pressure plate and the flywheel 3. Such assembly of the composite flywheel 1 with at least some of the aforementioned additional parts of the friction clutch into a module contributes to simplicity, lower cost and convenience of mounting the entire clutch on the output element of the engine. For example, such assembly of the module at the manufacturing plant renders it possible to avoid the customary centering of the clutch plate or clutch disc at the automobile assembly plant, the installation of the clutch plate or clutch disc between the axially movable pressure plate and the secondary flywheel 3, the attachment of the clutch cover to the flywheel 3, the utilization of the customary centering mandrel, the insertion of bolts, screws or other fasteners into the passages 5 of the hub 15, the tightening of the fasteners, and the extraction of the centering mandrel.

The hub 15 can be of one piece with the portion 14 of the main section 13 of the primary flywheel 2 or it can constitute a separately produced part which is thereupon non-rotatably affixed to the portion 14. Furthermore, the aforementioned module can already comprise the antifriction bearing 4 or an analogous friction reducing device. The fasteners which are to secure the primary flywheel 2 to the crankshaft or camshaft (output element) of the engine can be inserted into the passages 5 of the aforediscussed module at the manufacturing plant in such a way that they remain in optimum positions for introduction of their externally threaded shanks into the registering tapped bores of the output element of the engine. Reference may be had, for example, to the description of FIG. 1 in commonly owned U.S. Pat. No. 5,160,007 granted Nov. 3, 1992 to Wolfgang Reik et al. for "Apparatus for transmitting torque in the power trains of motor vehicles". For example, the fasteners can constitute hexagon socket screws which are held in optimum positions for introduction of their shanks into the output element of the engine by suitable yieldable locating or positioning means, all as described in the '007 patent. Thus, the locating or positioning means can be destroyed, or moved out of the way or deformed when the respective fasteners are being driven home by a rotary torque transmitting tool. Otherwise stated, the locating or positioning force which is necessary while the module containing such fasteners is maintained in storage, is being shipped to the user or is being installed in a power train can be readily overcome when the fasteners are being driven into the output element of the prime mover.

As also described in the '007 patent, the clutch plate, the pressure plate and the clutch spring of the aforementioned module can be provided with suitable windows or other forms of openings which are or can be aligned with the heads of the fasteners extending into the bores 5 so that such heads can be reached by the working end of a torque transmitting implement, either to drive the fasteners into the output element of the engine or to detach the primary flywheel 2 from such output element. The windows in at least one of the parts including the clutch disc, the pressure plate and the clutch spring can be smaller than the heads of the fasteners so that the shanks of the fasteners cannot leave the respective bores 5 even in the absence of the aforediscussed locating or positioning means in or at the bores 5. The windows in the clutch spring can constitute enlarged portions of slots which are provided between the radially extending prongs or tongues forming part of presently preferred types of clutch springs, namely diaphragm springs of the type having an annular portion which is tiltable at the inner side of the clutch cover and bears against the pressure plate (to urge the pressure plate against the clutch disc and to thus urge the clutch disc against the friction face 3a of the secondary flywheel 3) when the clutch is engaged. Reference may be had again to the commonly owned '007 patent. When the module is to be attached to or detached from the output element of the engine, the windows of the clutch spring are moved into at least partial alignment with the heads of the fasteners (i.e., with the bores 5), with the windows in the pressure plate and with the windows in the clutch disc in order to facilitate the introduction of the torque transmitting tool into engagement with the heads of the fasteners.

In order to further reduce the likelihood of overheating of the primary flywheel 2 and of viscous fluid in the chamber 11, the secondary flywheel 3 is or can be provided with channels 27 which extend between the two sides of the flywheel 3 and permit the circulation of a cooling fluid, such as atmospheric air. At least some of the channels 27 can extend in the circumferential direction of the flywheel 3. Adequate cooling of the secondary flywheel 3 (i.e., the prevention of transfer of excessive quantities of heat to the primary flywheel 2 and to the viscous fluid in the channel 11) is desirable and advantageous on the additional ground that excessive thermal stressing of one or more component parts of the clutch or another assembly of parts utilizing the composite flywheel 1 is likely to shorten the useful life of such assembly.

The module including the composite flywheel 1 can further comprise a pilot bearing for the front end of the input shaft of the variable-speed transmission which is coupled to the clutch disc of the friction clutch. Such pilot bearing can be confined within the hub 15. Several types of pilot bearings are disclosed and one such bearing is shown in the commonly owned patent '007.

It is further possible to provide the composite flywheel 1 or an equivalent composite flywheel with one or more friction generating devices. For example, the composite flywheel can embody at least one first friction generating device which is effective whenever at least one of the flywheels 2, 3 changes its angular position relative to the other flywheel, and at least one second friction generating device which may but need not be similar to or identical with the first friction generating device and is designed to oppose rotation of the flywheels 2, 3 relative to each other with a predetermined delay, i.e., subsequent to an initial stage of unopposed angular movement of the fywheel 2 or 3 relative to the other flywheel.

The exact configuration, mode of making and installation of a presently preferred member 20 will be described below. The member 20 can be made of a suitable metallic sheet material, e.g., in a deep drawing machine, and the hole in its central portion can be provided subsequent to completion of the deep drawing operation. Deep drawing is preferred at this time because it renders it possible to finish the member 20 with a requisite relatively high degree of precision without any or with negligible or minor secondary treatment. However, it is equally within the purview of the invention to subject the blank which is to be converted into a member 20 to one or more treatments in lieu of or in addition to deep drawing, for example, to deep drawing followed by a calibrating operation in order to ensure that the axially extending radially outer section or portion 28 will be accurately centered within the axially extending substantially cylindrical part 19 of the primary flywheel 2 without any additional treatment.

The portion or section 28 of the member 20 extends axially and away from that side of the primary flywheel 2 which confronts the prime mover when the main section 13 is affixed to the output element of the prime mover. The radially inwardly extending second portion or section 29 of the member 20 resembles a washer which is provided with the aforementioned pockets 32 to define the abutments 31 which alternate with the arcuate coil springs 10, as seen in the circumferential direction of the chamber 11. The radially inner part of the portion or section 29 of the member 20 is provided with the aforementioned shoulder or platform 25 for the radially outer portion of the membrane 24. The member 20 and the membrane 24 establish a so-called contact seal because they merely bear against but are free to turn relative to each other. The seal between the membrane 24 and the shoulder 25 serves primarily to prevent the penetration of foreign matter from the atmosphere into the radially inner portion of the chamber 11. As already mentioned hereinbefore, the likelihood of the escape of viscous fluid from the chamber 11 along the shoulder 25 is rather remote.

The zone of merger of the cylindrical section 28 into the radial section 29 is shown at 30 and resembles a portion of a conical frustum. The tip of the imaginary extension of the conical zone 30 is located on or at least close to the axis X—X at the left-hand side of the primary flywheel 2, as viewed in FIG. 1. This zone 30 cooperates with the part 18a of the portion 18 of the main section 13 of the primary flywheel 2 to ensure that the insertion of the member 20 into the main section 13 is terminated when the section 29 assumes an optimal axial position relative to the portion 14 of the main section 13.

The abutments 31 are located radially outwardly of the shoulder 25 and radially inwardly of the zone 30. Such abutments divide the radially outer compartment 12 of the chamber 11 into a pair of sockets each of which receives a portion of one of the coil springs 10. Such sockets are mirror images of sockets in the confronting side of the main section 13 of the primary flywheel 2. The main section 13 is further provided with abutments which may but need not be identical with the abutments 31 of the member 20 and each of which confronts an abutment 31 in the neutral or starting positions of the flywheels 2, 3 relative to each other. At such time, each of the two arms 21 of the flange 22 is disposed between an abutment 31 and an abutment of the main section 13 (as seen in the direction of the axis X—X). The surfaces bounding the sockets in the section 29 of the member 20 and the complementary sockets in the main section 13 are preferably or can be configurated in such a way that they closely follow the outlines of portions of the respective coil springs 10.

The section 28 of the member 20 comprises a cylindrical centering part 33 which actually abuts the adjacent inner side of the part 19 and cooperates with the latter to center the member 20 in the primary flywheel 2. The welded seam 20a secures the cylindrical part 33 to the part 19. The seam 20a is preferably a circumferentially complete seam which can fluidtightly seal the radially outer portion of the compartment 12 from the surrounding atmosphere. It has been found that laser welding is particularly suitable for sealingly securing the member 20 to the primary flywheel 2. In order to facilitate the application of the welded seam 20a, the corresponding portion of the part 19 is weakened by the provision of an external groove 34. It is also possible to weaken the section 28 in lieu of or in addition to weakening of the part 19.

The centering part 33 extends from the zone 30 in a direction away from the main section 13 of the primary flywheel 2 and merges into a radially outwardly flaring part 35 which, in turn merges into a larger-diameter cylindrical part 36. In the embodiment which is shown in FIGS. 1 and 2, the thickness of the part 19 is reduced in the region surrounding the outwardly flaring part 35 in such a way that the inner diameter of the part 19 is increased. This renders it possible to confine the part 35 in the part 19. In fact, the latter can extend axially at least slightly beyond the outwardly flaring part 35 so that it also surrounds at least a portion of the cylindrical part 36. In other words, the part 19 can confine a larger portion of the section 28 of the member 20 than shown in FIG. 1.

The major portion of the illustrated cylindrical part 36 extends axially away from the portion 14 of the main section 13 and beyond the part 19 to constitute the axially rightmost portion of the composite flywheel 1. The part 19 and the section 28 extend beyond the friction face 3a of the secondary flywheel 3 (as seen in the direction of the axis X—X and away from the main section 13 of the primary flywheel 2). FIG. 1 shows that nearly the entire cylindrical part 36 can extend axially and beyond the friction face 3a toward the cover of the friction clutch.

That portion of the cylindrical part 36 which extends axially and beyond the part 19 is provided with at least one recess or notch 37. FIG. 2 shows that the part 36 can be provided with two notches 37 which are spaced apart from each other in the circumferential direction of the member 20.

Such notches form part of means for generating signals which are transmitted to an engine management system not forming part of the present invention. The illustrated notches 37 extend all the way between the internal and external surfaces of the cylindrical part 36 and are open in a direction away from the primary flywheel 2, i.e., toward the cover of the friction clutch including a counterpressure plate constituted by the secondary flywheel 3. In other words, that edge face of the cylindrical part 36 which faces away from the primary flywheel 2 is interrupted at two circumferentially spaced-apart locations. However, it is equally possible to provide other types of signal generating means. For example, the notches 37 can be replaced by mere depressions in the external surface of the cylindrical part 36, i.e., one can merely reduce the thickness of the corresponding portions of the part 36. It is also possible to replace the notches 37 with radially extending bores which are drilled into the cylindrical part 36 in such a way that the right-hand edge face of the part 36 (as viewed in FIG. 1) is not interrupted at all. The aforementioned depressions can be provided by removing some material from the external surface of the cylindrical part 36, by displacing portions of the part 36 radially inwardly, or by merely compressing the corresponding portions of the part 36.

The aforedescribed configuration of the axially extending sleeve like portion 18 of the main section 13 and of the part 19 of the portion 18, as well as the aforedescribed configuration of the axially extending sleeve like section 28 of the member 20, render it possible to distribute the overall mass of the composite flywheel 1, and especially of the primary flywheel 2, in an optimum way in dependency upon the intended use of the composite flywheel. Thus, the masses of the constituents of the primary flywheel 2 and/or of the entire composite flywheel 1 can be distributed within a large diameter to thus exert a beneficial influence upon the mass moment of inertia of the primary flywheel 2. For example, the ratio of the mass moments of inertia between the primary and secondary sides of the composite flywheel can be in the range of 1 to 0.6.

Figure 3:
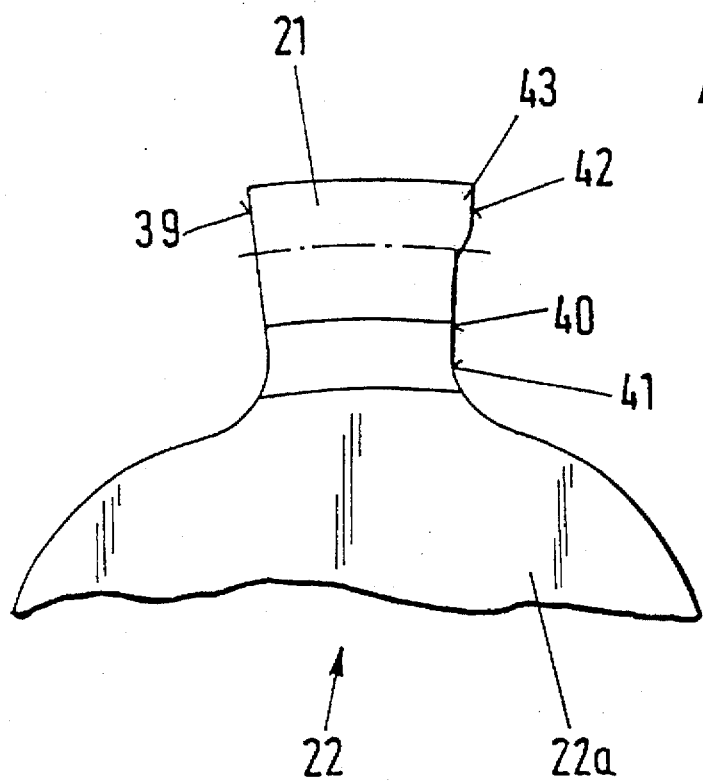
FIG. 3 is a fragmentary elevational view of the main portion and an elevational view of one arm of the rotary component of FIGS. 1 and 2.

The important details of the flange 22 are shown in FIG. 3. As already mentioned above, the main portion 22a of the flange 22 carries two arms 21 which are disposed diametrically opposite each other and which may or may not be identical. It is assumed here that the arm 21 which is shown in FIG. 3 is identical with the other arm. However, it is equally possible to construct the flange 22 in such a way that one of its arms 21 is identical with or at least similar to the arms on conventional flanges (see the arm 21' of the conventional flange 22' shown in FIG. 3a and having a main portion 22a') and only the other arm (such as the one shown in FIG. 3) is constructed and configurated in accordance with a feature of the present invention.

The arm 21 which is shown in FIG. 3 has a first side 39 which engages the adjacent end convolution of one of the coil springs 10 when the primary flywheel 2 turns relative to the secondary flywheel 3 in a first direction (note the arrow 45 in FIG. 2), and the arm 21 of FIG. 3 has a composite second side which engages the adjacent end convolution of the other coil spring 10 when the primary flywheel 2 turns relative to the secondary flywheel 3 in a second direction counter to the first direction (note the arrow 46 in FIG. 2).

Figure 3A:
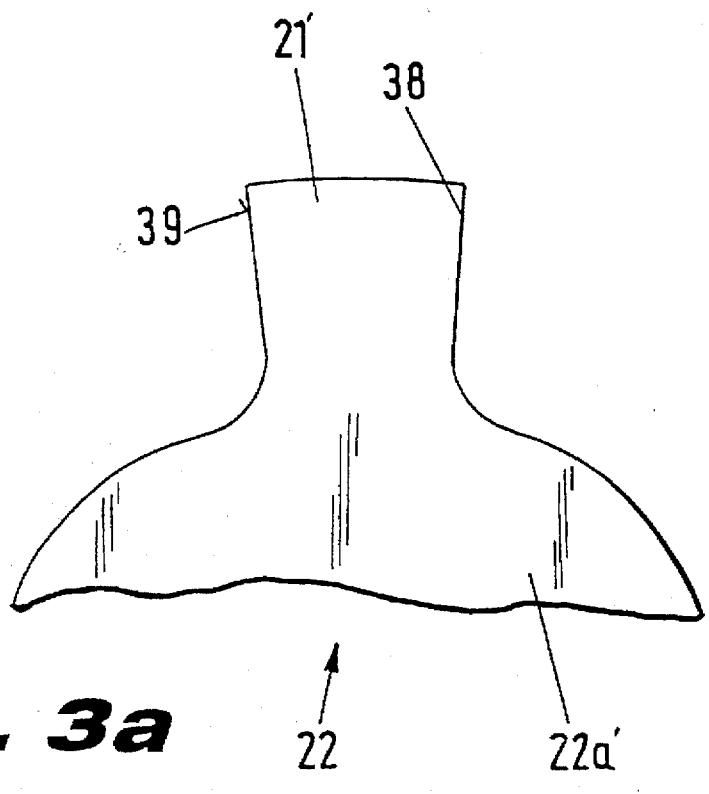
FIG. 3a is a fragmentary elevational view of a conventional rotary component.

The line 38 denotes in FIG. 3a the configuration of the right-hand side of a conventional arm 21', namely an arm having a first side 39 and a second side 38. The sides 38 and 39 extend substantially radially of the axis of the flange 22'.

The right hand side of the arm 21 which is shown in FIG. 3 includes a median portion 40, a radially inner portion 41 and a radially outer portion 42 provided with a projection 43 extending in the circumferential direction of the flange 22 and away from the first side 39. The projection 43 extends beyond the outline of a standard side 38 such as is provided on heretofore known arms 21' one of which is shown in FIG. 3a.

As can be seen in FIG. 2, the first side 39 of the arm 21 which is shown therein (and which is identical with the arm 21 of FIG. 3) can engage the entire confronting side of the adjacent end convolution 10a of the upper coil spring 10 of FIG. 2. In other words, when the arm 21 of FIG. 2 is caused to turn relative to the upper spring 10 in a counterclockwise direction, it simultaneously (or practically simultaneously) engages the radially innermost as well as the radially outermost portion of the end convolution 10a of the upper spring. Otherwise stated, the end convolution 10a is subjected to a stress which is uniformly distributed along the entire end convolution 10a, and more specifically along all portions of that side of the end convolution 10a which confronts the side 39 of the arm 21.

On the other hand, the second side of the arm 21 shown in FIG. 2 initially engages the adjacent end convolution 10b of the lower coil spring 10 in such a way that its projection 43 bears against the radially outer or outermost portion or part 44 of the end convolution 10b and the portion 41 engages the radially inner portion of the end convolution 10b only after a certain angular displacement of the arm 21 in a clockwise direction, as viewed in FIG. 2. Such positioning of the second side (40–43) of the arm 21 relative to the lower coil spring 10 ensures that the radially outer or outermost portion 44 of the convolution 10b is displaced prior to displacement of the other portions (including the radially innermost portion) of the end convolution 10b.

The configuration of the second side (40–43) of the arm 21 of FIGS. 2 and 3 entails that, when the flange 22 turns relative to the primary flywheel 2 in a clockwise direction (as viewed in FIG. 2), it initially displaces only the radially outer portion 44 of the end convolution 10b while covering an angular distance corresponding to the extent to which the projection 43 extends beyond the side 38 of the arm 21' shown in FIG. 3a. In other words, the inclination of the end convolution 10b relative to the adjacent intermediate convolution is changed because the radially outer portions 44 of neighboring convolutions of each spring 10 are spaced apart from each other a greater distance than the radially inner portions when the flywheels 2 and 3 are caused to dwell in their starting or neutral positions relative to each other.

Since the projection 43 is called upon to deform or stress only the radially outermost convolution 10b of the lower coil spring 10 during the initial stage of angular movement of the flange 22 in a clockwise direction (as viewed in FIG. 2) relative to the primary flywheel 2, or during the initial stage of counterclockwise angular movement of the flywheel 2 relative to the flange 22, the lower spring 10 of FIG. 2 offers a relatively small resistance to such angular movement of the flywheel 2 and the flange 22 relative to each other. The magnitude of the resistance offered by the end convolution 10b during such initial stage of angular movement of the flywheel 2 and flange 22 relative to each other depends upon the spring stiffness or spring rate as well as upon the extent of frictional engagement between the radially outermost portion 44 of the end convolution 10b and the adjacent surfaces bounding the corresponding portion or socket of the compartment 12.

The angle between the side 39 and the portion 41 of the second side of the arm 21 shown in FIGS. 2 and 3 is the same as the angle between the first side 39 and the portion 41 of the second side of the other arm 21, and such sides act upon the other end convolutions of the coil springs 10. This ensures that at least the radially inner portions of the end convolutions of the springs 10 are subjected to uniformly distributed stresses so that the two springs 10 are at least likely to be fully compressed at the same time. Such full compression takes place when the springs 10 begin to act as solid bodies, i.e., when each of their convolutions is in contact with the adjacent convolution so that the axial length of the springs cannot be reduced any more.

The flange 22 is preferably installed in the composite flywheel 1 in such a way that, when the vehicle is pulling a load (i.e., when the output element of the engine transmits torque to one or more wheels by way of the primary flywheel 2, the coil springs 10, the flange 22, the secondary flywheel 3, the other parts of the friction clutch including the flywheel 3, from the clutch disc to the input shaft of a transmission and from the output shaft of the transmission to one or more wheels), the end convolutions 10a of the coil springs are engaged by the at least substantially plane first sides 39 of the respective arms 21. On the other hand, when the vehicle is coasting (i.e., when one or more wheels of the vehicle drive the output element of the engine by way of the transmission, friction clutch including the secondary flywheel 3, the flange 22, the springs 10 and the primary flywheel 2), the second sides (40–43) of the arms 21 bear against the adjacent end convolutions 10b to thus transmit torque from the secondary flywheel 3 to the primary flywheel 2 by way of the flange 22 and the springs 10. As already mentioned before, the initial stage of angular displacement of the secondary flywheel 3 relative to the primary flywheel 2 during coasting (arrow 46 in FIG. 2) merely involves deformation of the outermost convolutions 10b of the coil springs because the radially outermost portions 44 of such outermost convolutions 10b are caused to bear against the adjacent projections 43 at the second sides of the respective arms 21. Such cooperation between the end convolutions 10b and the adjacent projections 43 brings about a number of important advantages which will be described below.

When the composite flywheel 1 is in the process of transmitting torque from the engine to the friction clutch while the vehicle pulls a load (arrow 45 in FIG. 2), the coil springs 10 are first displaced by the primary flywheel 2 in order to move the end convolutions 10a of the coil springs 10 into engagement with the first sides 39 of the respective arms 21. If the primary flywheel 2 continues to turn relative to the secondary flywheel 3, the coil springs 10 undergo progressive compression so that the radially inner portions of the convolutions of such springs ultimately come into actual abutment with neighboring radially inner portions, i.e., the springs 10 cannot be compressed any further because at least the radially inner portions of their convolutions cannot move nearer to one another. The primary flywheel 2 continues to transmit torque to the secondary flywheel 3 as long as it continues to receive torque from the output element of the engine. The extent of angular displacement of the flywheel 2 relative to the flywheel 3 in the direction of arrow 45 is dependent upon the magnitude of torque which is being transmitted to the composite flywheel 1. The aforedescribed mode of operation will be even more readily understood by assuming that the secondary flywheel 3 is at a standstill (together with the flange 22 which is non-rotatably affixed to the flywheel 3) while the primary flywheel 2 turns in the direction of the arrow 45.

Coasting of the vehicle (i.e., that mode of operation when the wheel or wheels of the vehicle drive the input element of the engine) is indicated in FIG. 2 by the arrow 46. It is again assumed that the flange 22 does not rotate and the primary flywheel 2 rotates in the direction of the arrow 46. However, it is also possible to interpret the coasting of the vehicle in such a way that the primary flywheel 2 is held against rotation and the flange 22 is being turned in the direction of the arrow 45 because, actually, no change in the direction of rotation takes place during switching from operation with pull to coasting; all that happens is that the angular positions of the flywheels 2 and 3 relative to each other change.

Going back to the assumption that the primary flywheel 2 turns in the direction of the arrow 46 relative to the flange 22 while the vehicle is coasting, this causes the radially outer portions of the end convolutions 10b to strike the adjacent projections 43 of the respective arms 21. The radially outer portions of the convolutions of the coil springs 10 bear against the adjacent portions of surfaces bounding the respective sockets of the compartment 12 with a force which depends upon the magnitude of the centrifugal force acting upon the springs 10, i.e., upon the RPM of the composite flywheel 1. The developing friction or moment of friction between the radially outermost convolutions of the coil springs 10 and the adjacent portions of surfaces bounding the corresponding sockets can rise to a value which suffices to prevent the springs 10 from expanding during rapid transition from operation with pull to coasting. Stated otherwise, the end convolutions 10a do not abut the first sides 39 of the adjacent arms 21 when the flywheels 2, 3 change their angular positions relative to each other.

If the flange 22 continues to turn relative to the flywheel 2 during coasting of the vehicle, the outermost convolutions 10b are twisted relative to the neighboring intermediate convolutions of the springs 10 so that the radially inner portions 40 of the second sides (40–43) of the arms 21 reach the radially inner portions of the adjacent end convolutions 10b. This takes place while the springs 10 are still in a stressed condition as a result of compression during the preceding operation of the vehicle with pull. Since the radially inner portions of all convolutions of the coil springs 10 are likely to come into actual contact with one another, shifting from the operation with pull to coasting of a vehicle which utilizes conventional arms 21' with first sides 39 and second sides 38 would invariably result in the generation of noise, known as booming, while the vehicle is coasting. This is attributed to the abrupt and pronounced impact of the sides 38 of conventional arm 21' against the rigid or practically rigid (fully compressed) springs 10. In addition, such sudden impacts can greatly shorten the useful life of the entire composite flywheel 1.

However, if at least one of the arms 21 is provided with a second side (40–43) of the type shown in FIGS. 2 and 3, the impact of the second sides of the arms 21 upon the adjacent end convolutions 10b of the coil springs 10 is much less pronounced. The reason is that the projections 43 initially displace only the radially outer portions 44 of the adjacent end convolutions 10b and this results in the generation of a force which corresponds to the spring rate or spring gradient of the end convolution 10b as well as to that amount of friction of such end convolution which develops as a result of frictional engagement between the convolution 10b and the adjacent surface in the respective socket of the compartment 12.

In certain instances, it suffices if the projection 43 extends beyond the portion 41 of the second side of an arm 21') through an angle of about 1°, as seen in the circumferential direction of the flange 22 and away from the respective first side 39. All in all, the projection 43 can extend beyond the portion 41 through an angle of up to 5°, normally or often between about 1° and 3°. All that counts is to ensure that one end convolution of at least one of the coil springs 10 is stressed differently than the other end convolution or convolutions during stressing of the at least one spring in one of two (clockwise and counterclockwise) directions.

FIGS. 4a, 4b, 4c and 4d show the details of four additional flanges 122, 222, 322 and 422.

The flange 122 of FIG. 4a has two arms 121 each having a first side 139 corresponding to the side 39 of the arm 21 shown in FIG. 3 and a second side corresponding to the right-hand side of the arm 21 of FIG. 3 and thus having a projection 143. The projections 143 face in the same direction, as seen in or counter to the direction of rotation of the flange 122, i.e., they act upon the adjacent end convolutions 10b (not shown in FIG. 4a) while the vehicle embodying the flange 122 is in the process of pulling a load or while the vehicle is coasting. The action of the projections 143 upon the adjacent end convolutions 10b can suffice to ensure the desired dynamic spring gradient.

FIG. 4b shows a flange 222 with two arms 221 and 221' one of which (namely the arm 221') is of conventional design (it has two identical sides 239) and the other of which (namely the arm 221) has two identical sides each corresponding to the right-hand side of the arm 21 shown in FIG. 3, i.e., each having a projection 243.

Figure 4D:
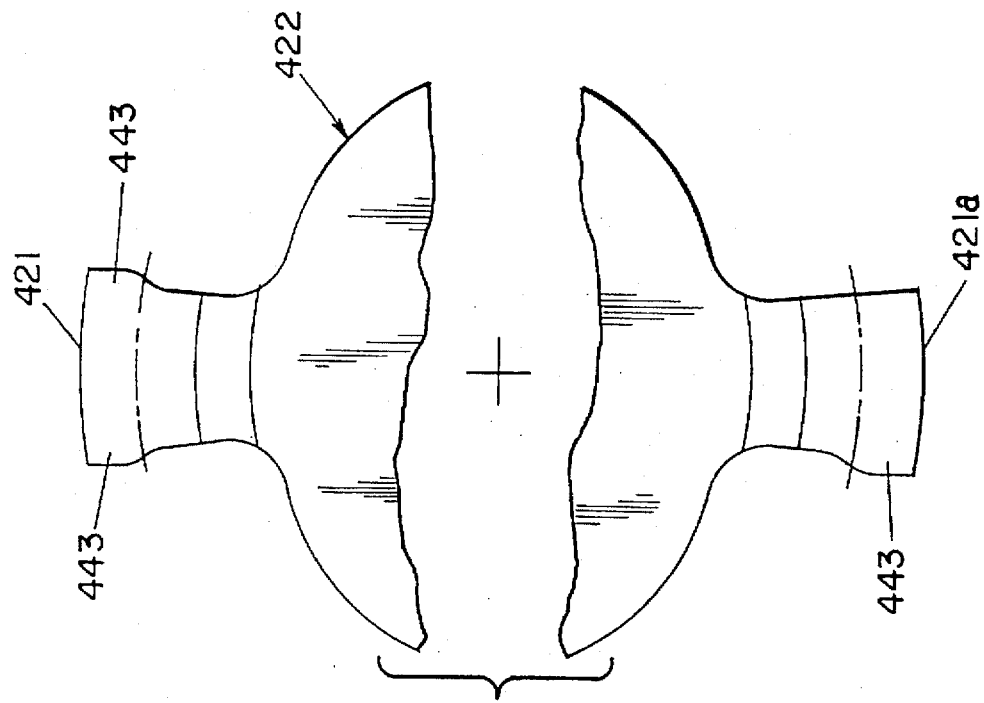
FIG. 4d is a similar view of a fifth rotary component.
Figure 4C:
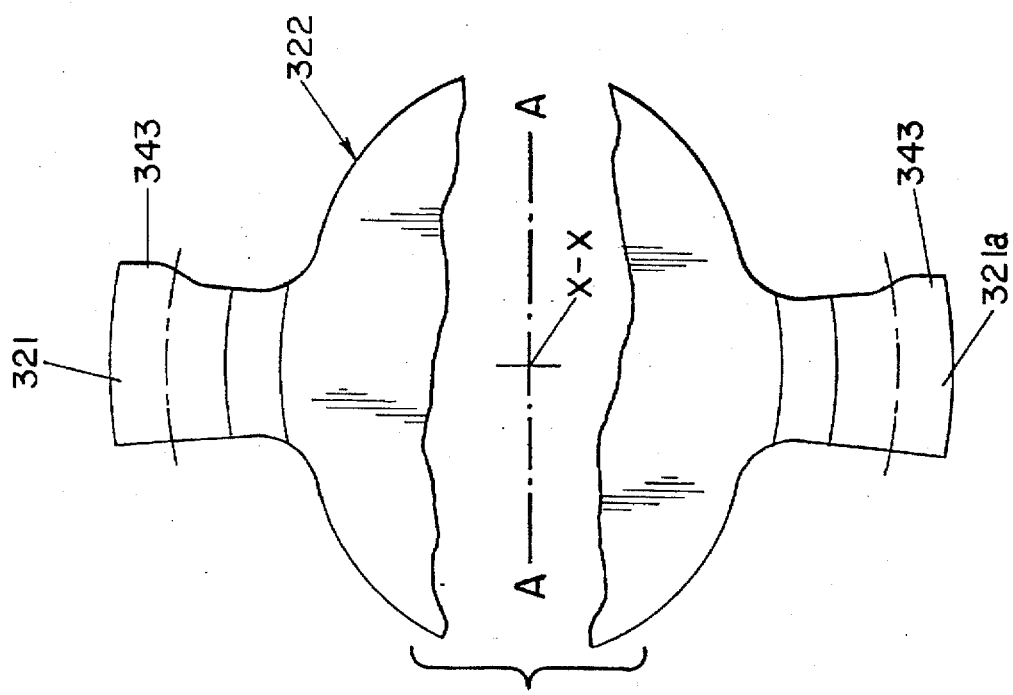
FIG. 4c is a similar view of a fourth rotary component.
Figure 5:
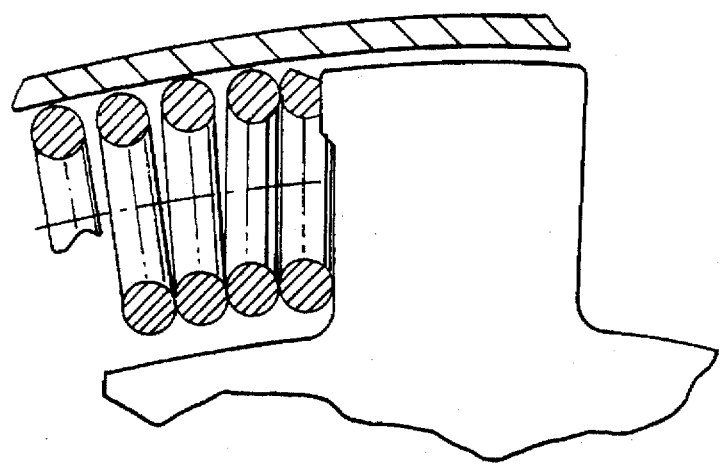
FIG. 5 is a view of the structure illustrated in FIG. 2.
Figure 6:
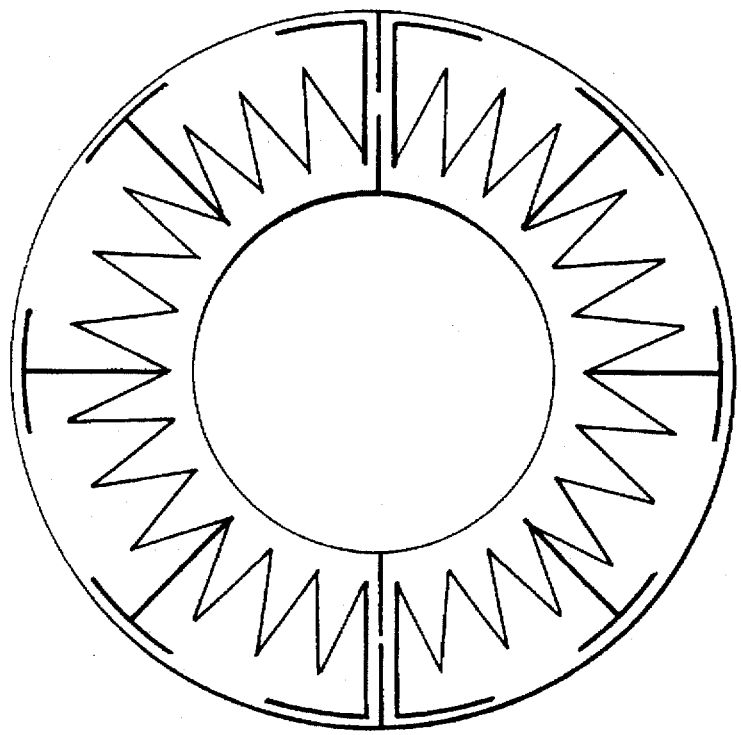
FIG. 6 is a view of composite elongated coil springs.

FIG. 4c illustrates a flange 322 with two arms 321 and 321a which are mirror images of each other with reference to a plane A—A including the axis X—X of the flange 322. The arm 321 has a single projection 343 facing in a clockwise direction, and the arm 321a has a single projection 343 facing in a counterclockwise direction.

FIG. 4d shows a flange 422 with two arms 421 and 421a. The arm 421 has two projections 443 and the arm 421a has a single projection 443.

One advantage of the upper arms 221, 421 which are respectively shown in FIGS. 4b and 4d is that their projections (243, 443) can bear against the adjacent end convolutions of the coil springs 10 (not shown in FIGS. 4b and 4d) regardless of the direction of rotation of the respective flanges 222, 422. The projection 443 on the lower arm 421a of the flange 422 shown in FIG. 4d can serve to engage the adjacent end convolution of a coil spring 10 when the flange 422 is caused to rotate in a clockwise direction (as viewed in FIG. 4d). This can happen while a vehicle embodying the flange 422 is coasting or while it is in the process of pulling a load. An advantage of the flange 422 is that it can ensure a lowering of the dynamically effective spring gradient even while the vehicle is idling. For example, the projections 443 of the arms 421a shown in FIG. 4d can be effective during each stage of idling of the engine in a motor vehicle as well as during each stage of coasting of the vehicle. The single projection 443 on the lower arm 421a of the flange 422 shown in FIG. 4d can be effective while the vehicle is pulling a load or while the vehicle is coasting.

One of the projections 343 of the flange 322 of FIG. 4c is efective during coasting of the vehicle, and the other projection 343 is effective while the vehicle is in the process of pulling a load.

It is clear that a flange (22, 122, 222, 322 or 422) with projection or projections (43, 143, 243, 343 or 443) arranged in a manner as shown in FIGS. 3 and 4a to 4d can be put to use in the illustrated composite twin-mass flywheel 1 of FIGS. 1 and 2 (i.e., in a flywheel wherein the damper 9 comprises an energy storing device with only two coil springs 10) as well as in many other types of flywheels. For example, the energy storing device of FIGS. 1 and 2 can be replaced with an energy storing device which employs three or more discrete coil springs corresponding to or resembling the coil springs 10.

It is further possible to replace the projection 43 of FIG. 3 or at least one of the plural projections 143, 243, 343 or 443 with recesses or cutouts or sockets for the radially outermost parts (such as 44 in FIG. 2) of the adjacent end convolutions. In other words, it is possible to design one or both arms of a flange 22, 122, 222, 322 or 422 in such a way that the radially inner end portions of the end convolutions (such as 10b in FIG. 2) are first to engage the adjacent sides of the respective arms, i.e., prior to engagement of such sides with the radially outermost parts (44) of the corresponding end convolutions. Such modification exhibits the advantage that, since the radially innermost parts of the end convolutions are much less likely (or not likely at all) to frictionally engage the adjacent surfaces bounding the compartment 12 than the radially outermost parts (44) of such end convolutions, at least when the coil springs 10 are being acted upon by centrifugal force, the frictional engagement between the coil springs and the housing (13, 20) is less pronounced. In other words, the radially outermost parts of convolutions of the coil springs are less likely to move into and to remain in pronounced frictional engagement with the adjacent surfaces of the housing (13, 20) which defines the chamber 11 regardless of whether the coil springs are in the process of storing (additional) energy or of dissipating stored energy.

An important advantage of a flange (such as 22) with two arms (such as 21) is that such construction renders it possible to ensure simultaneous or practically simultaneus maximum compression of the adjacent springs (such as the springs 10 shown in FIGS. 1 and 2). Expressed otherwise, this renders it possible to achieve an exact or at least substantial symmetry of the so-called blocking angles of the coil springs. This, in turn, renders it possible to keep the magnitude of stresses upon the fully compressed springs at a relatively low value. If the energy storing device of the damper 9 employs arcuate coil springs (such as the coil springs 10), this means that by providing at least one arm 21 with a projection 43 which extends in the circumferential direction of the flange 22, the stressing of the springs remains at least substantially constant because the maximum stressing takes place when the springs can be said to act as solid blocks with neighboring convolutions in actual contact with one another. Such maximum stressing will be maintained at a fixed value as in connection with flanges having conventional arms. A difference between the stressing of springs with conventional flanges 22' and the stressing of the springs 10 by the improved flange 22 is seen to reside in that, even when a spring 10 is fully compressed so that the radially inner portions of its convolutions actually abut one another, such spring can still undergo additional compression because the projection 43 can flex the adjacent convolution 10b by moving the radially outer portion 44 of such end convolution in the circumferential direction of the energy storing device including the springs 10.

The additional stressing of the end convolutions 10b can be varied or selected within a relatively wide range by appropriate configuration and/or inclination of the second side of at least one of the arms 21. Similar results can be achieved by selecting the inclination and/or the thickness of the end convolutions 10b in such a way that at least one of these parameters departs from the corresponding parameter of the other end convolution 10a and/or the intermediate convolutions including that immediately adjacent an end convolution 10b.

The energy storing device of the damper 9 preferably employs arcuate coil springs having a large length-to-diameter ratio. Such ratio can be well in excess of ten-to-one. At least one of the springs 10 can be replaced by two or more shorter coil springs disposed end-to-end. Furthermore, and as actually shown in the drawings, each of the coil springs 10 can confine a smaller-diameter coil spring.

The improved flange and the improved damper are susceptible of numerous additional modifications without departing from the spirit of the invention. For example, certain of the non-illustrated features can be combined with the illustrated features and the novel features can be utilized in combination with selected features of the apparatus and devices disclosed in the aforementioned commonly owned patents of the assignee of the present application. Furthermore, the invention also covers the method of assembling the damper 9, the method of making the flange 22, the method of installing the flange 22 in the damper 9, the method of installing the damper 9 in the composite flywheel 1, and a composite flywheel and/or a friction clutch or another clutch which employs or cooperates with the damper 9 and/or with the flange 22. Applicants reserve the right to present claims covering such additional features during the pendency of the present application or in a continuation, division or continuation in part of the present application.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art and, therefore, such adaptations should and are intended to be comprehended within the meaning and range of equivalence of the appended claims.

What is claimed is:

1. A torsional vibration damper, comprising input and output members angularly movable with each other about a common axis and relative to each other from neutral positions; and means for yieldably opposing angular movements of said members relative to each other, comprising a large-diameter annular energy storing device including at least two arcuate coil springs, said coil springs being adjacent each other in a circumferential direction of said members and having centers of curvature at least close to said axis and each of said coil springs having a first and a second end convolution, and a component rotatable about said axis and including a ring-shaped main portion and at least two arms extending from said main portion substantially radially of said axis and each disposed between a pair of end convolutions including one end convolution of one of said springs and one end convolution of another of said springs, each of said arms having a first side at one end convolution of the respective pair and a second side at the other end convolution of the respective pair, at least one side of at least one of said arms being different from the other side of said at least one arm, said at least one side of said at least one arm having a first portion more distant from and a second portion nearer to said axis, at least one projection being provided on said first portion of said at least one side of said at least one arm and said portions of said at least one side of said at least one arm being configurated to first effect a stressing of said other end convolution by said projection and to thereupon effect a stressing of said other end convolution by said second portion in response to angular movement of said members relative to each other from said neutral positions.

2. The damper of claim 1, wherein said members are rotatable at a plurality of different speeds and said springs frictionally engage at least one of said members under the action of centrifugal force with a force which increases in response to increasing rotational speed of said members and operates in parallel with the bias of said springs in said circumferential direction with attendant increasing dynamic resistance of said springs to rotation with said members relative to each other.

3. The damper of claim 1, wherein at least one of said members defines a substantially annular channel for at least a portion of each of said springs.

4. The damper of claim 1, wherein said coil springs are elongated in said circumferential direction.

5. The damper of claim 1, wherein at least one of said at least two springs is elongated and is composed of a plurality of relatively short springs as seen in said circumferential direction.

6. A torsional vibration damper comprising input and output members angularly movable with each other about a common axis and relative to each other from neutral positions; and means for yieldably opposing angular movements of said members relative to each other, comprising at least two elongated arcuate coil springs extending about said axis, said input member having first abutments for said coil springs and said output member having second abutments for said coil springs, each of said second abutments being adjacent one of said first abutments in the neutral positions of said members, each of said coil springs having a first and a second end convolution and one of said members including a component having a ring-shaped main portion which includes said abutments of said one member, each abutment of said one member being disposed between a pair of end convolutions including one end convolution of one of said springs and one end convolution of another of said springs, at least one abutment of said one member having a first side at one end convolution of the respective pair and a second side at the other end convolution of the respective pair, at least one of said sides cooperating with two spaced-apart portions of the adjacent end convolution of the respective pair of end convolutions and said at least one side being configured to first effect a stressing of one of said spaced-apart portions of said adjacent end convolution and to thereupon also effect a stressing of the other of said spaced-apart portions of said adjacent end convolution in response to angular movement of said members relative to each other from said neutral positions.

7. The torsional vibration damper of claim 6, wherein said abutments of the other of said members form part of a housing for said coil springs.

8. The torsional vibration damper of claim 6, wherein said at least one side of said at least one abutment of said one member has at least one projection extending in a circumferential direction of said members.

9. The torsional vibration damper of claim 8, wherein said at least one side has a first portion more distant from and a second portion nearer to said axis, said at least one projection being provided on said first portion of said at least one side.

10. The torsional vibration damper of claim 8, wherein one of said two spaced-apart portions of said adjacent end convolution is more distant from said axis than the other of said two spaced-apart portions of said adjacent end convolution, said at least one projection being arranged to bear against said one portion of said adjacent end convolution.

11. The torsional vibration damper of claim 8, wherein said at least one side of said at least one abutment has a first portion more distant from and a second portion nearer to said axis, said at least one projection being provided on said first portion of said at least one side of said at least one abutment and said second portion being at least substantially identical with a portion of the other side of said at least one abutment.

12. The torsional vibration damper of claim 6, wherein said main portion has two abutments.

13. The torsional vibration damper of claim 6, wherein said main portion and said abutments of said one member form a torque transmitting part of the damper.

14. The torsional vibration damper of claim 6, wherein said members are installed in a motor vehicle and said at least one side of said at least one abutment stresses said adjacent end convolution when the vehicle is coasting.

15. The torsional vibration damper of claim 6, wherein said coil springs further have intermediate convolutions between the respective end convolutions, all of said convolutions having first portions remote from and second portions nearer to said axis, said second portions of all convolutions of at least one of said springs abutting each other in response to the application of predetermined stresses to first and second end convolutions of said at least one spring.

16. The torsional vibration damper of claim 15, wherein said second portions of all convolutions of each of said springs abut each other at least substantially simultaneously in response to the application of said predetermined stresses to the first and second end convolutions of said springs.

17. The torsional vibration damper of claim 6 wherein only one side of each abutment of said one member has at least one projection extending in a circumferential direction of said members.

18. The torsional vibration damper of claim 6, wherein each side of said at least one abutment of said one member has at least one projection extending in a circumferential direction of said members and only one side of each other abutment of said one member has at least one projection extending in said circumferential direction.

19. The torsional vibration damper of claim 6, wherein said one member has two abutments which are substantial mirror images of each other with reference to a plane including said axis.

20. The torsional vibration damper of claim 6, wherein at least one side of at least one abutment of said one member has at least one recess.

21. The torsional vibration damper of claim 6, wherein said abutments of said one member are spaced apart from each other a substantial distance in a circumferential direction of said main portion so as to provide room for elongated arcuate coil springs having large length-to-diameter ratios.

22. The torsional vibration damper of claim 6, wherein each side of said at least one abutment of said one member has at least one projection extending in a circumferential direction of said members.

23. The torsional vibration damper of claim 6, wherein at least one side of each abutment of said one member has at least one projection extending in a circumferential direction of said members.

24. The torsional vibration damper of claim 6, wherein said main portion comprises at least two arms extending at least substantially radially of said axis and each including one abutment of said one member.

25. The torsional vibration damper of claim 6, wherein said one member is said output member.

26. The torsional vibration damper of claim 6, wherein each abutment of said one member has a side which is at least substantially identical with said at least one side of said at least one abutment of said one member.

27. The torsional vibration damper of claim 6, wherein the other side of said at least one abutment is at least substantially a mirror image of said at least one side with reference to a plane including said axis.

28. The torsional vibration damper of claim 6, wherein said main portion comprises arms extending substantially radially of said axis and each of said arms including one abutment of said one member, the other of said members having a pair of abutments for each of said arms and each of said arms being disposed between the abutments of the respective pair in the neutral positions of said members.

* * * * *